United States Patent [19]

Fennell

[11] Patent Number: 5,418,524
[45] Date of Patent: May 23, 1995

[54] METHOD AND APPARATUS FOR OVER-THE-AIR UPGRADING OF RADIO MODEM APPLICATION SOFTWARE

[75] Inventor: Robert D. Fennell, Coral Springs, Fla.

[73] Assignee: Motorola, Inc., Schaumburg, Ill.

[21] Appl. No.: 962,769

[22] Filed: Oct. 19, 1992

Related U.S. Application Data

[63] Continuation-in-part of Ser. No. 923,056, Jul. 31, 1992, Pat. No. 5,302,947.

[51] Int. Cl.⁶ .............................................. G08B 3/10
[52] U.S. Cl. ........................... 340/825.22; 340/825.44; 364/705.05
[58] Field of Search .............................. 379/57, 59, 98; 340/825.22, 825.44; 364/705.01, 705.05

[56] References Cited

U.S. PATENT DOCUMENTS

| | | | |
|---|---|---|---|
| 4,839,628 | 6/1989 | Davis et al. | 340/825.44 |
| 4,845,491 | 7/1989 | Fascenda et al. | 340/825.44 |
| 4,910,510 | 3/1990 | Davis et al. | 340/825.44 |
| 4,972,457 | 11/1990 | O'Sullivan | 379/59 |
| 5,043,721 | 8/1991 | May | 340/825.44 |
| 5,049,874 | 9/1991 | Ishida et al. | 340/825.44 |
| 5,302,947 | 4/1994 | Fuller et al. | 340/825.44 |

OTHER PUBLICATIONS

"PC Card Standard", Release 2.0, published by Personal Computer Memory Card International Association, Sep. 1991.
"Socket Services Interface Specification", Release 1.01, published by Personal Computer Memory Card International Association, Sep. 1991.
NewsStream TM Advanced Information Receiver TM Service Manual, 68814B05-0, published by Motorola, Inc., Jan. 1992.
NewsStream TM Advanced Information Receiver TM Operating Instructions, 6882023B98-0, published by Motorola, Inc., Jan. 1992.

*Primary Examiner*—Donald J. Yusko
*Assistant Examiner*—Edward Merz
*Attorney, Agent, or Firm*—Gregg E. Rasor

[57] ABSTRACT

A radio modem (100) having application software (128) stored therein receives upgrade information via over-the-air selective call messaging. The upgrade information comprises upgrade installation information and upgrade data. A microprocessor (108) compiles the upgrade installation information and operates to upgrade the application software (128) in accordance with the upgrade installation information and in response to the upgrade data. Likewise, application software in the computer (302) can be upgraded by over-the-air transmission of upgrade information to the radio modem (100).

5 Claims, 2 Drawing Sheets

METHOD AND APPARATUS FOR OVER-THE-AIR UPGRADING OF RADIO MODEM APPLICATION SOFTWARE

This is a continuation-in-part of U.S. patent application Ser. No. 07/923,056, filed Jul. 31, 1942, now U.S. Pat. No. 5,302,947 by Fuller, et al., entitled "METHOD AND APPARATUS FOR LOADING A SOFTWARE PROGRAM FROM A RADIO MODEM INTO AN EXTERNAL COMPUTER".

FIELD OF THE INVENTION

This invention relates in general to selective call receivers, and more specifically to selective call receivers having application software bundled therein.

BACKGROUND OF THE INVENTION

The "radio modem," i.e., a selective call receiver having a data interface for communicating with an external computer, is well known in the art. An example is the NewsStream ™ Advanced Data Receiver manufactured by Motorola, Inc. of Schaumburg, Ill. This radio modem is intended for use with computers having an RS-232 port and a telecommunications program that supports a popular file transfer protocol called "XMODEM." Coupling the data interface of the conventional radio modem with such a computer allows the computer to receive information transmitted by radio and addressed to the radio modem and to store the received information in a file. Additional file access or other software is required when a user then wishes to examine or work with the information in the file.

While the conventional radio modem provides an excellent method of receiving information in a portable computer, the application software available for most portable computers does little beyond displaying information received and perhaps doing a name or telephone number look-up based on information received through the radio modem. Application software for providing vertical services that are custom tailored to the needs of various users is becoming available. As the pace of availability of application software increases, many software vendors create improved versions of application software and issue update software which, when installed, converts the application software to a more recent version.

An obstacle to improving software is the need for a user to be able to purchase a machine-readable copy of the upgrade software and to load the upgrade software to install the new version of the application software. Especially with a radio modem having limited direct interface ability, loading the upgrade software is problematic. One solution would be to purchase the upgrade software on a diskette and load the upgrade software from the diskette to a computer, then loading the upgrade from the computer to the radio modem via the interface therebetween. Such a solution requires a large amount of user tasking and is therefore not preferable. Also, a system provider who wishes to update service-accessing application software cannot guarantee that all users will upgrade the software. This could result in substantial outlay of repair and maintenance time for the service provider to perform upgrading of the software.

Thus, what is needed is a method and apparatus for upgrading application software via a radio modem, and particularly for upgrading application software bundled within a radio modem.

SUMMARY OF THE INVENTION

In carrying out the objects of the invention in one form, there is provided a selective call receiver for receiving and decoding selective call radio signals comprising upgrade information. The selective call receiver comprises a receiving means for receiving and decoding the selective call radio signals to recover the upgrade information transmitted therein and a memory means coupled to the receiving means for storing the upgrade information. The information comprises upgrade installation information and upgrade data. The selective call receiver also comprises data interface means for coupling with an external computer means to transmit information thereto. The external computer means has application software stored therein. Additionally, the selective call receiver comprises control means coupled to the first and second memory means for compiling the upgrade installation information and for executing the compiled upgrade installation information in accordance with the upgrade data to upgrade the application software.

In another form there is provided a method in a selective call receiver for upgrading application software stored therein. The selective call receiver comprises a processor coupled to a memory and a data interface for controlling interactions between the processor and the memory. The method comprises the steps of (a) receiving upgrade information comprising upgrade installation software and upgrade data, (b) loading the upgrade installation software into the processor, (c) upgrading the application software in accordance with the upgrade installation software and in response to the upgrade data, and (d) deleting the upgrade installation software and the upgrade data.

DESCRIPTION OF THE PREFERRED EMBODIMENT

Figure 1:
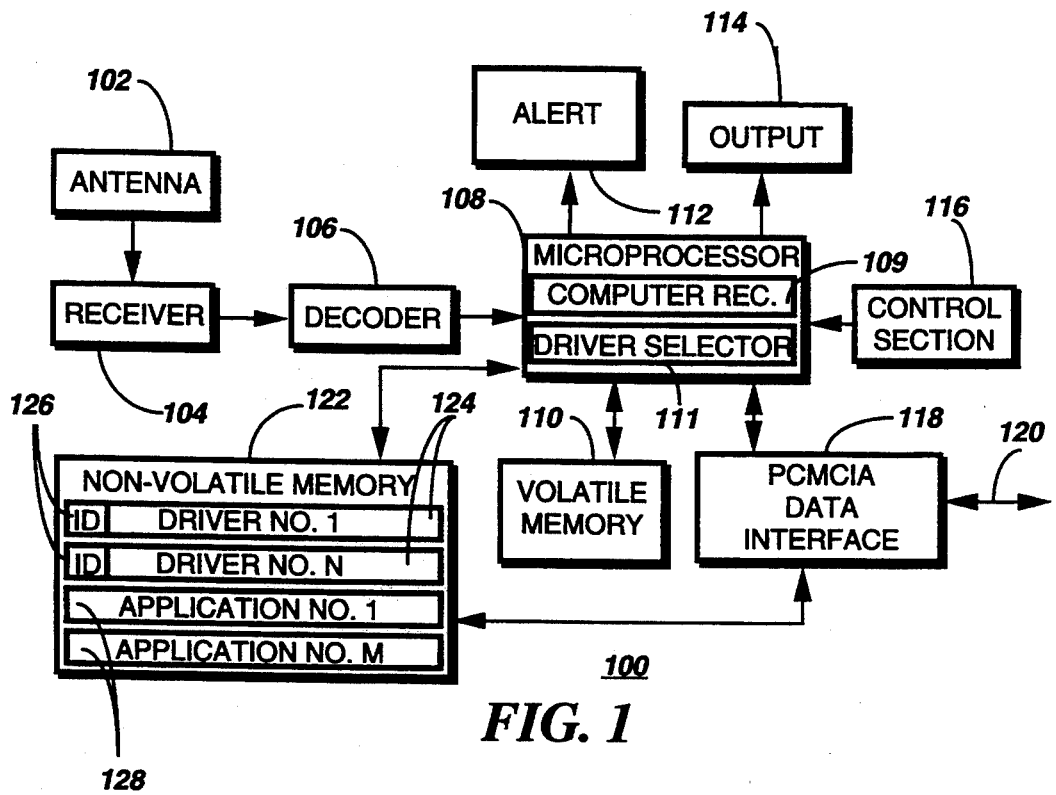
FIG. 1 is a block diagram of a radio modem in accordance with the preferred embodiment of the present invention.

Referring to FIG. 1, a block diagram of a radio modem 100 in accordance with the preferred embodiment of the present invention comprises an antenna 102 for intercepting RF signals. The antenna 102 is coupled to a receiver 104 for receiving and demodulating the RF signals intercepted. A decoder 106 is coupled to the receiver 104 for decoding demodulated information. A microprocessor 108 receives the decoded information from the decoder 106 and processes the information to recover messages. The microprocessor 108 is coupled to a volatile memory 110 for storing the messages recovered, and the microprocessor 108 controls the storing and recalling of the messages. An alert generator 112 is coupled to the microprocessor 108 for providing an audible or tactile alert to a user when the microprocessor 108 has a message ready for presentation.

An output device 114 comprises a visual display or a speaker or both, the output device 114 also being controlled by the microprocessor 108. A control section 116 comprises user accessible controls for allowing the user to command the microprocessor 108 to perform the selective call receiver operations well known to those skilled in the art and typically includes control switches such as an on/off control button, a function control, etc.

The microprocessor 108 is coupled to a non-volatile memory 122, such as an Electrically Erasable Programmable Read Only Memory (EEPROM), and a data interface 118 for controlling and communicating with the non-volatile memory 122 and the data interface 118, in accordance with the present invention. The non-volatile memory 122 and the data interface 118 are also coupled to each other for providing direct communication between the non-volatile memory 122 and the data interface 118. The data interface 118 is constructed and controlled in a manner that meets the standards set forth in two documents entitled "PC Card Standard," Release 2.0, and "Socket Services Interface Specification," Release 1.01, both published by the Personal Computer Memory Card International Association (PCMCIA), in September 1991. These two documents together will be referred to hereinafter as the "PCMCIA Standard." The data interface 118 couples with external equipment, e.g., an external computer, by a PCMCIA bus 120.

The non-volatile memory 1.22 is pre-programmed with a plurality of software driver programs 124, each identified by an identifier 126 that identifies an external computer with which the software driver program 124 is compatible. The non-volatile memory 122 also is pre-programmed with at least one application program 128. The function of the software driver programs 124 is to compensate for the differences among external computers such that the interface between each application program 128 and the external computer when loaded with a compatible software driver program 124 is a viable interface. That is, a single application program 128 will function correctly with any of the external computers for which there exists a compatible software driver program 124.

The microprocessor 108 comprises a computer recognition element 109 for recognizing one of a plurality of specific types of external computer in response to identifier signals provided to the data interface 118 by the external computer. The microprocessor 108 further comprises a driver selector element 111 for selecting one of the plurality of software driver programs 124 compatible with a recognized one of a plurality of specific types of external computer whose identifier signals match a corresponding one of the identifiers 126.

Figure 2:
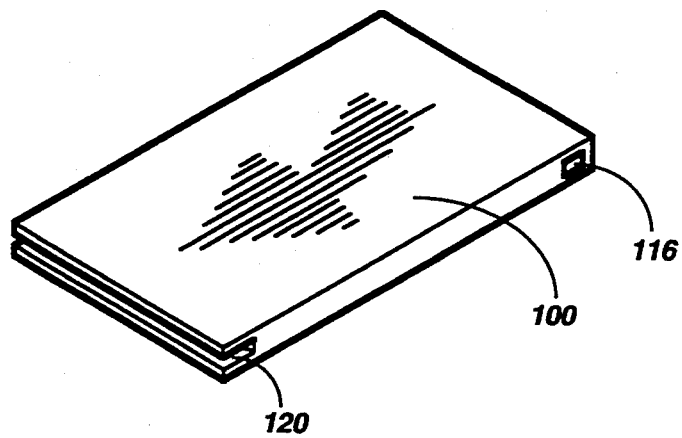
FIG. 2 is an isometric view of the radio modem in accordance with the preferred embodiment of the present invention.
Figure 3:
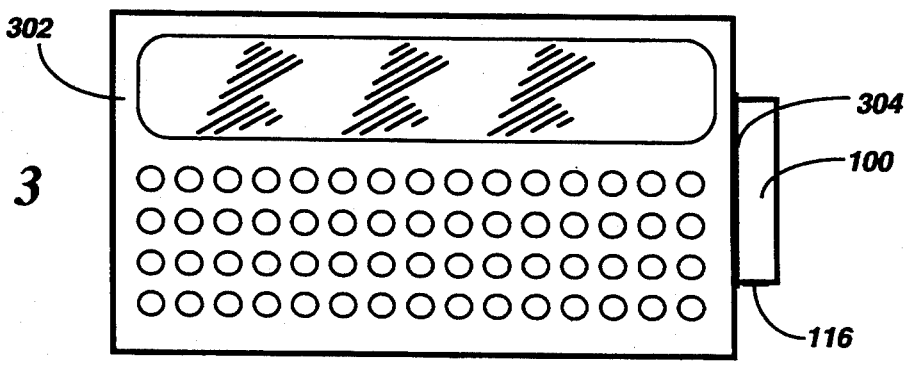
FIG. 3 is an orthographic top view of the radio modem installed in an external computer in accordance with the preferred embodiment of the present invention.

Referring to FIGS. 2 and 3, an isometric view of the radio modem 100 and an orthographic top view of the radio modem 100 installed in an external computer 302 in accordance with the preferred embodiment of the present invention shows a connector comprising the PCMCIA bus 120 at one end of the radio modem 100. When the radio modem 100 is inserted into a PCMCIA slot 304 of the external computer 302, as shown in FIG. 3, the radio modem 100 and the external computer 302 are electrically coupled by the PCMCIA bus 120, allowing communication to take place between the radio modem 100 and the external computer 302.

It is important to note here that the function of the software driver program 124 (FIG. 1) is to present a consistent interface to the application program 128 (FIG. 1). The consistent interface allows each of the application programs 128 to operate compatibly with all types of external computer 302 (FIG. 3) for which there exists a software driver program 124 (FIG. 1) in the radio modem 100. This means that the application program 128 does not have to be modified in any way to make the application program 128 function with different external computers 302. The same statement applies to application programs that may reside in the external computer 302 itself. That is, once an application program has been developed for one type of external computer 302 that is compatible with one of the software driver programs 124 of the radio modem 100, the same application program will also function correctly with other types of external computer 302 that are compatible with one of the software driver programs 124 of the radio modem 100. The result is a tremendous reduction in effort required to build application support for the radio modem 100 compatible with many types of external computer 302.

Because the software driver programs 124 (FIG. 1) are part of the radio modem 100, the software driver programs 124 can be modified at the same time that future modifications are made to the radio modem 100, e.g., to add new features to the radio modem 100, etc. Such future modifications to the software driver programs 124 will be done to maintain a consistent and invariant interface for the application program 128 (FIG. 1) internal to the radio modem 100 and for any other application programs that may have been developed for external use with the radio modem 100. The maintenance of the consistent and invariant application program interface allows an increase of functionality between the application programs and the radio modem, because changing characteristics internal to the radio modem, e.g., real-time clock setting commands, message storage locations, message labels, type of microprocessor used, etc., will not affect the interface to the application programs. As a consequence, it will be possible to allow greater control of the internal features of the radio modem 100 by the application programs without the risk of massive required future modifications to the application software as a result of necessary future radio modem redesigns.

There will of course be application programs that perform operations in response to receiving decoded information from the radio modem, e.g., an application program that displays the decoded information as it is received. Greater control by application programs of internal features of the radio modem 100, however, will advantageously make it possible to provide application programs that perform operations in response to stimuli other than receiving a page, e.g., a search program for searching the memory 110 (FIG. 1) of the radio modem 100 to find a certain category of received information, the search being started in response to a user command entered from a keyboard, for example.

Furthermore, the cost savings provided by the ability to create a single application program that will operate on a plurality of external computers 302 (FIG. 3) while not requiring major modification for many years makes it feasible to develop custom-tailored application programs. For example, it will be possible to develop a special application program custom-tailored for the real estate market that would allow keyed searches of multiple listing information received by the radio modem 100.

Additionally, the updating of the application software 128 and the software driver programs 124 via over-the-air selective call messages sent to the radio modem allow control of updating to be in the hands of the selective call system provider. A consistent and across-the-board updating of application software allows the system provider a quicker time frame for making modifications to the system. Additionally, since the radio modem receives selective call messages, the updating can be controlled as to which radio modems have software updated and which do not.

Figure 4:
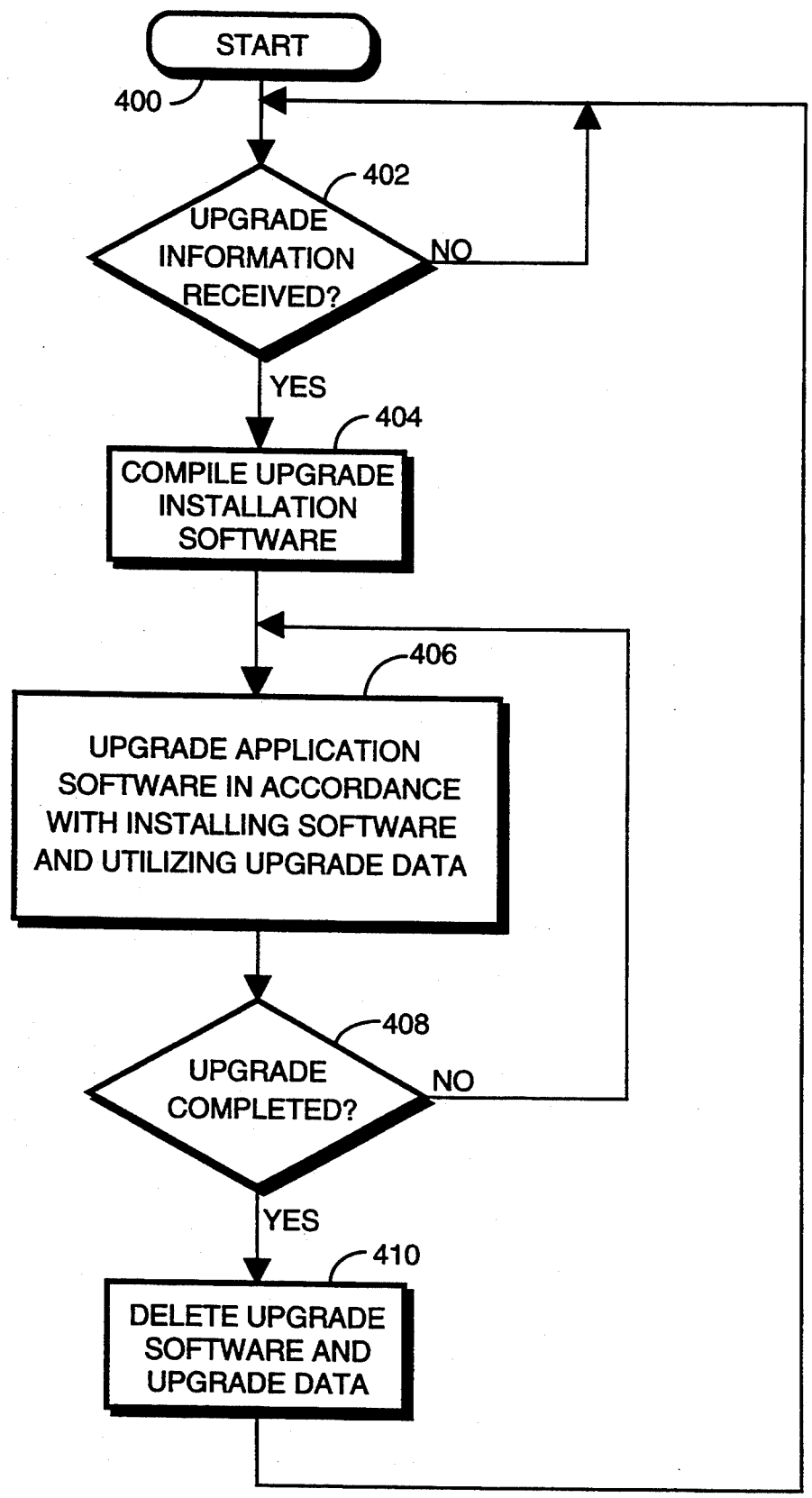
FIG. 4 is a flow chart of a method of updating application software bundled into the radio modem in accordance with the preferred embodiment of the present invention.

Referring to FIG. 4, a flow chart of a method of updating the application software 128 (FIG. 1) in accordance with the preferred embodiment of the present invention begins with the powering up of the radio modem 400. Following power up, processing awaits reception of upgrade information 402 over-the-air. The upgrade information is received 402 as a selective call message and Stored in the radio modem volatile memory 110 (FIG. 1). A selective call message may be identified by a unique selective call address reserved for the purpose or information in the signaling protocol may indicate that the message comprises upgrade information.

Included within the selective call upgrade message is installation software which can be used by the microprocessor 108 to upgrade the application software 128 (FIG. 1) and upgrade data. The upgrade installation software is retrieved from the memory 110 and compiled 404 by the microprocessor 108. The microprocessor 108 then upgrades 406 the, application software 128 in accordance with the installation software compiled in the microprocessor 108 and utilizing the upgrade data stored in the memory 110. When the upgrading of the application software 128 is completed 408, the upgrade software in the microprocessor 108 and the upgrade data in the memory 110 are deleted 410 and processing returns to perform normal radio modem operations until the next upgrade information is received 402.

Alternatively, the present method could allow for updating application software in the computer 302 (FIG. 3). The radio modem is coupled to the computer to allow for communication therebetween. The upgrade information could be forwarded to the computer for use thereby to upgrade application software stored therein. For example, the radio modem provides the upgrade information to the computer for storing in the random access memory (RAM) thereof. The operation would be the same as shown in the flow chart of FIG. 4, where the compilation 404 takes place in the computer's 302 Central Processing Unit (CPU).

By now it should be appreciated that there has been provided a method and apparatus for upgrading application software via a radio modem, and particularly for upgrading application software bundled within a radio modem. The method and apparatus in accordance with the present invention allows a selective call service provider to control software upgrading in either the radio modem 100 or the coupled computer 302 by over-the-air selective signaling. The service provider can thereby upgrade application software selectively and transparently to the user.

I claim:

1. In a selective call receiver, a method of upgrading application software stored therein, the selective call receiver comprising a processor coupled to a memory and a data interface for controlling interactions between the processor and the memory, the method comprising the steps of:
   (a) receiving upgrade information comprising upgrade installation software and upgrade data;
   (b) loading the upgrade installation software into the processor;
   (c) upgrading the application software in accordance with the upgrade installation software and in response to the upgrade data; and
   (d) deleting the upgrade installation software and the upgrade data.

2. The method of claim 1 wherein the application software is stored in a computer coupled to the selective call receiver, and wherein the step (c) Of upgrading the application software comprises the steps of:
   (e) establishing communication between the selective call receiver and the computer; and
   (f) upgrading the application software in the computer in accordance with the upgrade installation software and in response to the upgrade data.

3. A selective call receiver for receiving and decoding selective call radio signals comprising information, the selective call receiver comprising:
   receiving means for receiving and decoding the selective call radio signals to recover the information transmitted therein;
   first memory means having application software stored therein;
   second memory means coupled to the receiving means for storing the information, wherein the information comprises upgrade installation information and upgrade data; and
   control means coupled to the first and second memory means for compiling the upgrade installation information and for executing the compiled upgrade installation information in accordance with the upgrade data to upgrade the application software.

4. A selective call receiver for receiving and decoding selective call radio signals comprising upgrade information, the selective call receiver comprising:
   receiving means for receiving and decoding the selective call radio signals to recover the upgrade information transmitted therein;
   memory means coupled to the receiving means for storing the upgrade information, wherein the grade information comprises upgrade installation information and upgrade data;
   data interface means for coupling with an external computer means to transmit information thereto, the external computer means having application software stored in a memory resident in the external computer means; and
   control means coupled to a first and a second memory means for compiling the upgrade installation information and for executing the compiled upgrade installation information in accordance with the upgrade data to upgrade the application software.

5. A selective call receiver that performs an operating procedure to upgrade application software stored in an external computer, the selective call receiver comprising:
   a processor coupled to a memory;
   a data interface for controlling interactions between the processor and the memory;

means coupled to the data interface for establishing communication between the selective call receiver and the external computer;

means for receiving upgrade information comprising upgrade installation software and upgrade data for re-programming the external computer;

means for loading the upgrade installation software into the processor;

means for upgrading the application software stored in a memory resident in the external computer in accordance with the upgrade installation software and in response to the upgrade data; and means for deleting the upgrade installation software and the upgrade data.

* * * * *